United States Patent [19]
Sykes et al.

[11] 3,949,955
[45] Apr. 13, 1976

[54] MONOPULSE RECEIVER CIRCUIT FOR AN ANTI-RADAR MISSILE TRACKING SYSTEM

[75] Inventors: Langthorne Sykes, Manhattan Beach; Duane J. Russell; Robert E. Atkinson, both of China Lake, all of Calif.

[73] Assignee: The United States of America as represented by the Secretary of the Navy, Washington, D.C.

[22] Filed: Apr. 4, 1963

[21] Appl. No.: 270,773

[52] U.S. Cl. .............................. 244/3.19; 343/16 M
[51] Int. Cl.² ...................... F41G 7/00; G01S 9/22
[58] Field of Search.................... 244/14, 14.3, 3.19; 343/16 M

[56] References Cited
UNITED STATES PATENTS

| | | | |
|---|---|---|---|
| 2,457,393 | 12/1948 | Muffly | 244/14.3 |
| 2,670,158 | 2/1954 | Philpott | 244/14 |
| 2,935,942 | 5/1960 | Young et al. | 244/14.3 |
| 2,969,018 | 1/1961 | Erst et al. | 244/14.3 |

*Primary Examiner*—Malcolm F. Hubler
*Attorney, Agent, or Firm*—R. S. Sciascia; Roy Miller

EXEMPLARY CLAIM

1. In a monopulse radar receiver system for determining the angular co-ordinates of a pulsed RF radiation source, the combination comprising:
   an RF signal processing circuit adapted to convert a directional antenna input signals to inversely related pairs of computer input pulses;
   a pair of automatic gain control pre-amplifiers connected to said processing circuit adapted to simultaneously receive and amplify the pairs of input signals;
   a difference circuit connected between the outputs of each pair of pre-amplifiers for providing a difference signal pulse;
   amplifying means connected with said difference circuit for amplifying said difference signal pulse;
   a leading-edge gate circuit connected with said amplifying means, adapted to be operatively triggered at the pulse-repetition rate of the pulses propagated by the RF radiation source for accepting only the leading edge of each amplified difference signal pulse;
   means for triggering the gate circuit;
   a pulse integrator circuit connected with the output of said gate circuit adapted to provide an output signal which is a function of the position of the source of radiation;
   direct connecting means joining the output of said integrator with one pre-amplifier of said pair for directing the integrator output signal to the one pre-amplifier for dirving the gain thereof in a first direction;
   an inverter circuit connecting the output of said integrator with the other pre-amplifier of said pair, adapted to invert and combine a reference voltage with the output of said integrator circuit to provide an inverted gain control signal having a reference imposed thereon for driving the gain of the other pre-amplifier in a second direction opposed to said first direction; and
   a second difference circuit connected with the output of said integrator and the output of said inverter circuit for deriving a difference signal indicative of the angular co-ordinate of the source of pulsed RF radiation, relative to said system, when the difference signal is driven to a zero valve.

3 Claims, 4 Drawing Figures

INVENTORS.
DUANE JACK RUSSELL
LANGTHORNE SYKES
ROBERT E. ATKINSON
BY
ATTORNEY.

MONOPULSE RECEIVER CIRCUIT FOR AN ANTI-RADAR MISSILE TRACKING SYSTEM

The invention herein described may be manufactured and used by or for the Government of the United States of America for governmental purposes without the payment of any royalties thereon on therefor.

The present invention relates to missile guidance systems, and more particularly to a passive radar signal receiver for a missile guidance system which is capable of seeking out and tracking radiation emitting sources.

In the field of missile guidance there are many known tracking systems for directing a warhead to a selected target. The known systems rely on guidance techniques which range from programmed guidance, to in-flight target search, detection, and selection. However, none of the known systems comprise passive systems capable of tracking a pulsed radiation source by receiving emitted pulse radiation and determining and angular co-ordinates of the source, through the use of closed loop monopulse techniques. Tracking systems which receive and utilize emitted radiaton for target tracking purposes are particularly useful in anti-radiation missile guidance.

One type of missile utilized as an anti-radiation device is a warhead bearing, rocket propelled missile which is initially launched ballistically from a piloted aircraft, or other suitable means, into a field of radiation, with missile guidance and directional control being subsequently imposed for the terminal portion of the missile's trajectory in order that the missile may "home" on the radiation source to a miss distance compatible with a given kill radius of the missile's warhead.

Therefore, the general purpose of the instant invention is to provide a closed loop monopulse receiver-computer system for use in air-to-surface, missile guidance systems which supply necessary target detection and missile navigational intelligence to the missile's launching aircraft and subsequently to the missile's control surface drive systems, hereinafter referred to as the missile's servo control system.

An object of the present invention is to provide a guidance system which is completely passive for operating against pulsed radar emission sources.

Another object is to provide a device capable of processing directional information and supplying navigational intelligence to a missile's servo control system.

A further object is to provide a device capable of operating over a wide RF (radio frequency) bandwidth and a wide range of pulse repetition frequencies.

Still a further object is to provide a closed loop tracking device with a system which utilizes monopulse techniques to solve a radiation emitting target's position in terms of its Cartesian or angular co-ordinates.

Other objects, advantages and novel features of the invention will become apparent from the following detailed description of the invention when considered in conjunction with the accompanying drawings wherein:

FIG. 1 comprises a diagrammatic view illustrating an operation of a missile utilizing a guidance system of the instant invention;

FIG. 4 is a schematic plan view illustrating signal processing functions of the guidance system's antenna, signal processing unit, and a difference circuit as provided for in the present invention.

Figure 1:
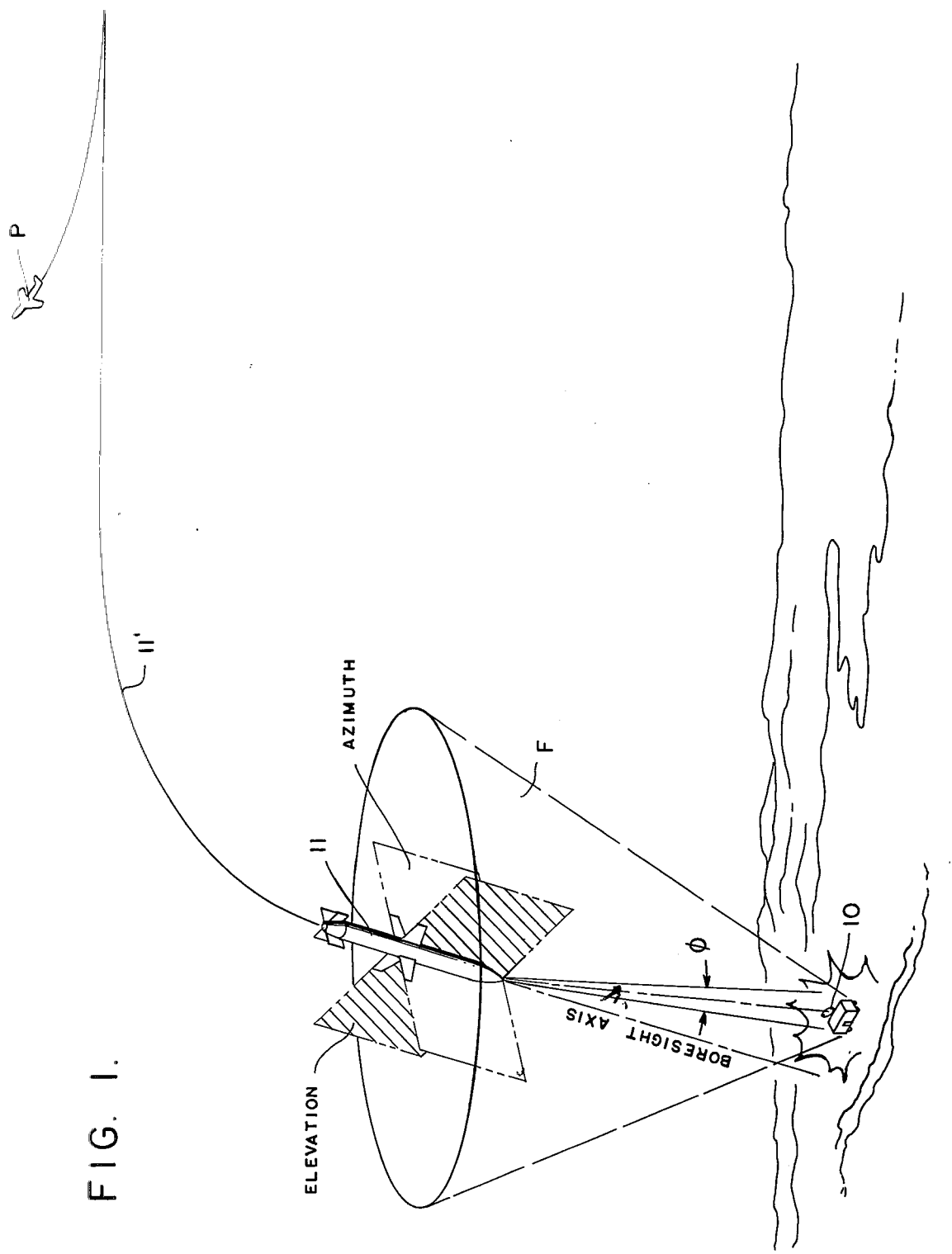
Figure 2:
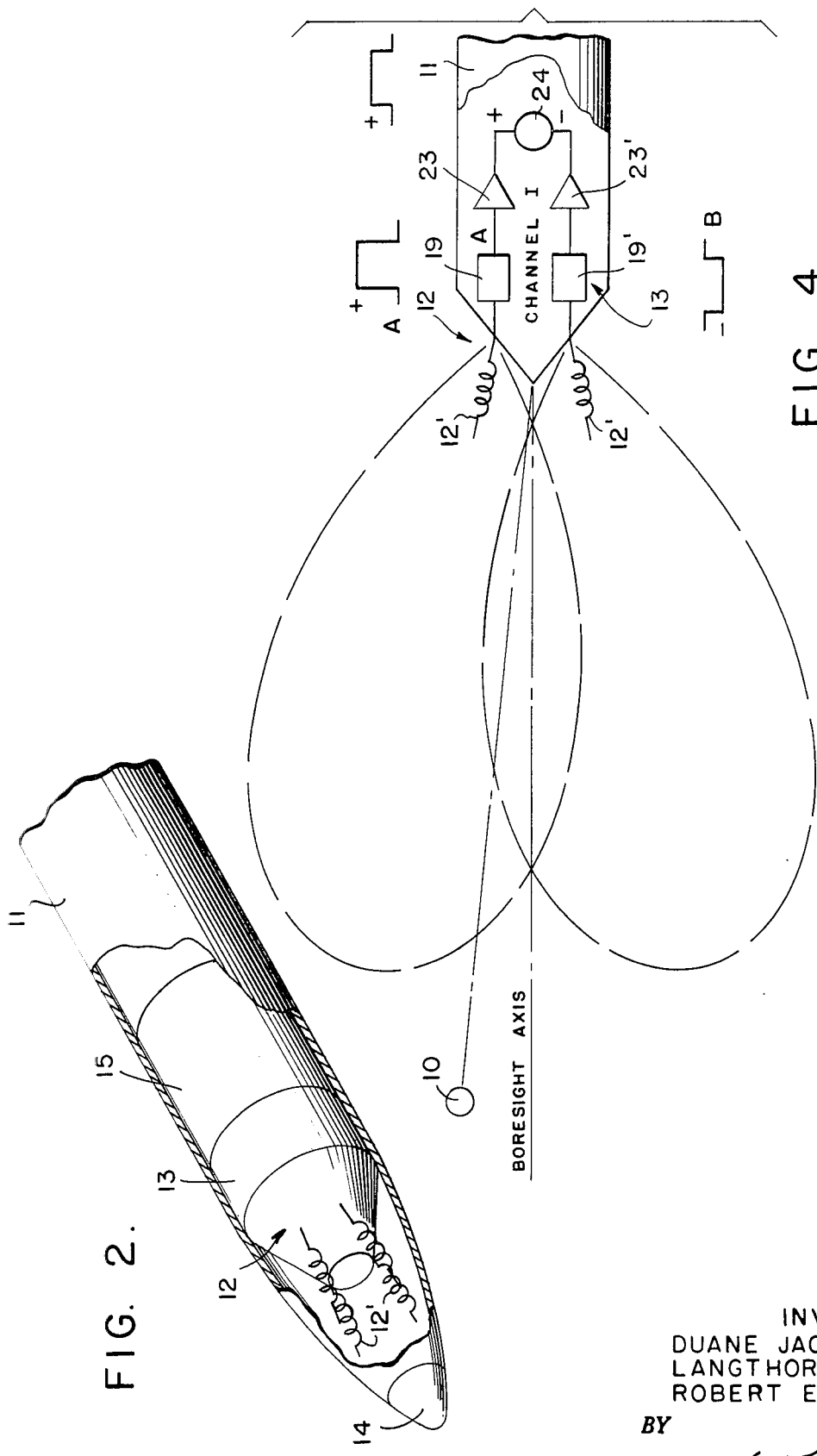
FIG. 2 is a fragmentary schematic view, on an enlarged scale, illustrating an arrangement of components, for the guidance device of the instant invention.

Referring now more specifically to the drawings wherein like reference characters designate like or corresponding parts throughout the several views, there is shown in FIG. 1 a radar, or radiation source, generally designated 10, which emits a field of pulsed radiation F. An antiradiation warhead bearing missile 11 is illustrated as having been launched, or ballistically fired, from a piloted aircraft or other suitable means P, into the field of radiation F and is progressing along a trajectory 11' toward the radiation source 10, so that the missile will impact within a "kill distance" of the source. Turning now to FIG. 2, within the forward portion of the missile 11 there is a directional antenna section, generally designated 12, provided with four oppositely disposed antenna arms 12'. Following the antenna section 12 there is disposed an RF signal processing section, generally designated 13, being so mounted within the forward portion of missile as to be protected by a radome 14, which is formed of any suitable material, secured to structural components of the missile to provide a nose cone therefor.

Arranged immediately adjacent the signal processing section 13, there is a missile guidance receiver-computer system 15 housed within the missile's body. The receiver-computer system FIGS. 3 and 4, receives input signals, in the form of video pulses, and provides pulsed output signals bearing missile navigational or guidance intelligence. The output signals from the receiver-computer system are directed to the missile's servo control system which utilizes the intelligence to impose directional control on the missile.

As the missile servo control system forms no part of the present invention, and is of known design, a detailed description thereof is omitted in the interest of brevity.

It is to be particularly noted that while the receiver-computer system of the instant invention is disclosed as providing navigational or guidance intelligence to a rocket propelled missile's guidance servo control system for directing a rocket to a source of radiation, it is to be understood that the receiver-computer system, and components thereof, may provide in-flight guidance intelligence for controlling guided vehicles, of a general nature, under the influence of a radar emitting source.

The antenna and RF signal processing unit may be of any suitable design and configuration, for example, the type disclosed in co-pending application Ser. No. 265,003, filed Mar. 7, 1963 may be employed. However, for purposes of the present disclosure, the antenna 12 is assumed to be of conventional design and is arranged so as to supply target direction information through the four arms 12', in a known manner, to provide RF signals to the signal processing section 13, which there converts the input RF signals into target position information bearing pulses. The pulses, in this form, are then utilized by the receiver-computer unit comprising the present invention for determining the target's angular co-ordinates. Information contained within input RF signals is in the form of pulse amplitude which is detected by section 13, through matched silicon diodes 19 and 19' and is fed as video pulsed signals to the receiver-computer 15 through pairs of input terminals 21, 21' and 22, 22'.

Figure 3:
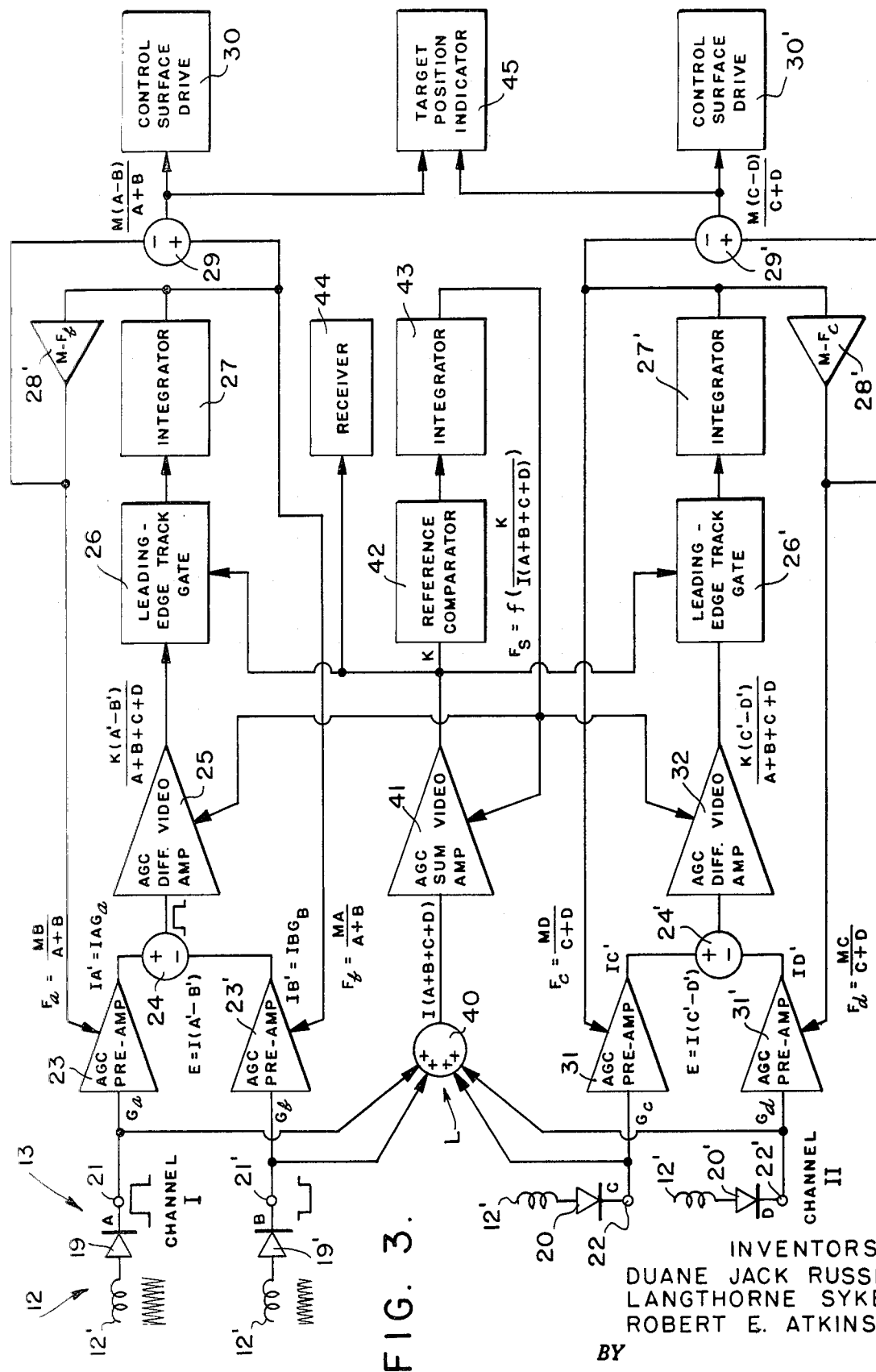
FIG. 3 is a diagrammatic view, in block form, illustrating a circuit comprising a plurality of closed loop circuits as provided for in the instant invention.

The receiver-computer system 15 is made up of three closed loops, of which two loops comprise channels I and II, FIG. 3, and serve for tracking and solving the angular position of the target in terms of its angular or Cartesian co-ordinates. The Cartesian co-ordinates define a line of intersection of planes representing azimuth and elevation which are assumed to be common to a pair of intersecting planes defined by the missile's control surfaces, as shown in FIG. 1, for thereby establishing a directional reference with respect to azimuth and elevation. Since the intensity factor I, for the RF signals, is dependent upon the power output, attitude and range of the target source, with respect to the receiving antenna 12, and is common to all receiver-computer system input RF signals, hereinafter referred to as A, B, C and D, any guidance determining mathematical equation relating to the target's position must have the intensity factor I canceled therefrom in order for the equation to be useful, as there is no convenient technique for measuring the intensity factor. Therefore, a third, or sum, loop is provided for removing each RF signal's intensity factor I in a manner hereinafter described.

As channels I and II are of similar design and function in a like manner a specific description of a single channel, viz., channel I, is deemed sufficient. Therefore, referring now to FIGS. 3 and 4, it is understood that source emitted RF pulses are received at the opposite arms 12' of the antenna 12, and are then converted to video pulsed input signals A and B through silicon diode detectors 19 and 19'. The pulsed signals A and B are fed through connecting terminals 21 and 21' to AGC (automatic gain control) pre-amplifiers 23 and 23' FIG. 3. The instantaneous gains for the pre-amplifiers 23 and 23' are designated $G_a$ and $G_b$, respectively. Outputs are obtained from the pre-amplifiers 23 and 23' and are subtracted, through the use of a conventional difference means 24, with the difference signal then being fed to and amplified by an AGC difference video amplifier 25. Adjacent the AGC amplifier 25 there is arranged a leading-edge track gate 26 to which are directed amplified pulsed output signals from the amplifier 25.

The leading-edge track gate 26 selects only the leading edge of each incoming pulse to provide guidance information to an adjacently disposed pulse integrator circuit 27, which may be of the type disclosed in co-pending application Ser. No. 149,134, filed Oct. 31, 1961, now U.S. Pat. No. 3,119,029. Through selecting only the leading edge of each pulse, the track gate 26 thus serves to prevent the missile from processing and consequently "guiding on" reflected radiations generated by the target 10. This function is made possible because of the intrinsicly longer source-to-target path required for reflected source-generated radiation.

The integrator circuit 27 functions, as described in above-mentioned application, to provide an integrated output signal $F_b$, which is fed back to impose a control on the gain of pre-amplifier 23'. The signal $F_b$ is simultaneously subtracted from a given reference voltage M, imposed at a signal inverter 28, to provide a feedback signal $F_a$ for controlling the gain of the AGC pre-amplifier 23. It is to be noted that a leading-edge track gate 26', integrator 27', and an inverter 28' are to be provided, in a like manner, within the channel II to perform the functions attributed to components 26, 27 and 28 of channel I, as will hereinafter become apparent.

It is to be particularly noted that control signals $F_a$ and $F_b$ dictate the gains for amplifiers 23 and 23' so that they are caused to vary inversely with respect to each other, viz., the gain of either of the two pre-amplifiers will be increased, simultaneously, while the gain of the other is being decreased in order to drive the difference of their outputs to zero. For example, if a pulsed input signal A, received from diode 19, is larger in amplitude than a pulsed input signal B, received from diode 19', because of a particular orientation of a radiating target with respect to the boresight axis of the missile 11, FIG. 4, it becomes necessary for the integrator 27 to decrease gain $G_a$ of pre-amplifier 23 while increasing gain $G_b$ of pre-amplifier 23' in order to provide a zero difference output from the pre-amplifiers. With a zero difference output established between the outputs of the pre-amplifiers, the feedback signals $F_a$ and $F_b$ may be subtracted at a difference device or circuit 29 in order to provide guidance intelligence to the missile's servo-control means 30.

The hereinabove described function of channel I may be described mathematically. By expressing the difference output of the pre-amplifiers 23 and 23' as E, with the output of pre-amplifier 23 expressed as IA', and the output of pre-amplifier 23' as IB', it is to be understood that where $IA = IAG_a$ and $IB' = IBG_b$, the difference output $E = IAG_a - IBG_b = 0$ when the system has locked on a given target or radiation source. Assuming a direct proportionality between feedback voltages $F_a$ and $F_b$, and gains $G_a$ and $G_b$, it is possible to express $AF_a - BF_b$ as being equal to zero. It is to be particularly noted that the target intensity factor I can be canceled whenever $E = 0$. By utilizing the hereinbefore mentioned reference voltage M, of a predetermined value, to provide the signal $F_a$ as a feedback signal to pre-amplifier 23, and since $F_b$ is the feedback signal to pre-amplifier 23', it is understood that $F_a = M - F_b$, $AM - AF_b - BF_b = 0$, and $$F_b = \frac{MA}{A+B}$$

Using $F_b = M - F_a$ and $$F_a = \frac{MB}{A+B},$$

subtracting the feedback voltages $$F_b - F_a = \frac{M(A-B)}{A+B}.$$

Target information is obtained in a similar manner through channel II. It is understood that $$F_d - F_c = \frac{M(C-D)}{C+D}.$$

where input signals are provided through terminals 22 and 22' to pre-amplifiers 31 and 31' having feedback signals $F_c$ and $F_d$ provided in a manner similar to that described in conjunction with the description of channel I.

The loops or channels I and II of the hereinabove described receiver-computer system are utilized simultaneously to locate a target positioned in normally intersecting planes and with respect to both vertical and horizontal axes. However, it is to be particularly noted that each of the loops or channels I and II may be used separately and independently of each other in order to locate a target with respect to a single given axis.

While the loops or channels I and II function quite satisfactorily for detecting and tracking a single radiation source, the two loop system fails to process the aforementioned intensity factor, as required when the system is to function in a multi-source radiation field. Since the amplitudes of the output pulses from the difference circuits of channels I and II serve as a function of the target intensity factor I, as well as the target direction, it becomes necessary to account for this factor in order to distinguish between the various RF signals received at the antenna 12. The necessity of such distinction arises when the target is located within a field having a plurality of radiation sources operating at various intensities. For example, it is possible for a target operating at one intensity, and located to one side of a given guide beam, to provide radiation of the same intensity at an arm 12' of the antenna 12, as a target operating at a lower intensity but located at a position nearer the apex of a given guide beam. Therefore, it is understood that where multiple radiation sources are present, it becomes necessary to process the received RF signals to remove the intensity factor I in order to determine which of the received pulsed signals are from a desired target source and those which are not.

As the intensity factor I is not readily measureable, as aforementioned, this factor is to be canceled from the output signal pulses E, of the difference means 24. This is accomplished through the third or sum loop having an input means generally designated L, FIG. 3, for receiving signals A, B, C, and D from the diode detectors 19, 19' and 20, 20', respectively It is to be particularly noted that removal of the range intensity factor I, utilizing the sum loop, does not constitute a mere duplication of the removal of the target intensity, as performed by the loops or channels I and II which serve to remove the input signal intensity when the output difference signal E, from the difference means 24, is equal to zero. On the contrary, the sum loop is provided for removing the intensity factor I when the difference signal E does not equal zero.

The sum loop utilized with channels I and II may be of the type more specifically described and disclosed in co-pending application Ser. No. 256,178, filed FEB. 4, 1963 now U.S. Pat. No. 3,222,505. For purposes of the present invention, however, it suffices to understand that the input pulses A, B, C, and D from the diodes 19, 19' and 20, 20' of the RF signal unit 13 are summed at a summing means or circuit 40 and fed to an AGC sum video amplifier 41. The amplifier 41 has gain characteristics identical to those attributed the AGC difference video amplifiers 25 and 32 as aforementioned in conjunction with the description of channels I and II. A reference voltage K is imposed on the sum loop at a reference comparator 42 with the output from the sum video amplifier 41 being subtracted from the reference voltage K, at the comparator 42, to provide a difference voltage which drives an integrator 43 of the type aforementioned. The integrator 43 provides an output signal $F_s$ for imposing a control on the system's AGC video amplifiers 25, 32 and 41. The gain of the sum video amplifier 41 is controlled, under the dictates of the integrator 43, so as to drive its output signal to equal the reference voltage K, whereby K may be equated to the product of the input of the amplifier 41 times its gain. As the input signal to the amplifier 41 corresponds to I(A + B + C + D), the gain thereof must be K/I (A + B + C + D) in order that K equal the output thereof. Because the signal $F_s$ 15 common to the three video amplifiers 25, 32 and 41, the gain of the AGC difference video amplifiers 25 and 32 is also K/I (A + B + C + D).

The intensity factor I may now be canceled from the loops or channels I and II so that a single target radiation source may be selected on a basis of its position relative to the missile in a multi-source radiation field and without regard to the intensity factor. The cancellation of the intensity factor I for a given channel I, for example, may be effected through setting $IAG_a = IA'$ and $IBG_b = IB'$ so that the difference input signal E to the video amplifier 25 is I(A'− b'), with its output then being $$\frac{K(A' - B')}{A + B + C + D}$$

with the target intensity factor being canceled therefrom. It is to be understood that the intensity factor may be canceled from the video amplifier 32 in a like manner.

It should be particularly noted that the terms A − B and C − D represent angles measured with respect to the system's boresight axes, while the terms A' − B' and C'− D' refer to angles measured with respect to the angles represented by A − B and C − D, respectively. By knowing the maximum angular deviation of a target with respect to the system's boresight, on a pulse by pulse basis, the amplitude of the signals from the target source 10 appearing at the output of the difference video amplifiers 25 and 32, can be predicted. Any signal of a greater amplitude must be from some other radiating source and accordingly may be discarded. Therefore, the function of predicting a pulse amplitude for a given target source provides the basis for selecting signals from a particular target or radiation source within a multi-target environment. Rejection of signals corresponding to A' − B' or C' − D' greater than some pre-selected limit provides the missile with a narrow look angle $\phi$, FIG. 1, the angle from within which the missile will accept radiated signals.

The output of the AGC sum video amplifier 41 is also used for triggering the leading-edge track gate 26 and provides a signal to a receiver 44, provided for an operator, pilot, or the like. The signal to the receiver 44 and the gate 26 is a pulse-repetition frequency signal emitted from the target which is being locked onto. Further, a target position indicator 45, may be coupled with the circuit between the outputs for channels I and II to provide, for example, a visual target tracking display unit.

In operation, it is assumed that an anti-radar missile 11, containing a receiver-computer having therein the aforedescribed three closed servo mechanism loops, is launched toward a target from a vehicle or aircraft P into a field of radiation F. It is understood that the missile's launch is dictated through an operator of the vehicle P upon his receiving a pre-determined pulse-repetition signal through the receiver 44, and/or the target indicator 45.

Control is initiated for the terminal portion of the missile's trajectory toward a selected source of radiation 10 as the missile 11 approaches the pulsed radiation source 10. Source generated RF signal pulses are received at opposite arms 12' of the antenna 12. As schematically shown, FIG. 4, radiated signals A and B are received in a given plane at one side of the boresight axis through antenna arms 12' for providing RF signals to a guidance loop or channel I. After the signals A and B are received at the antenna 12 they are converted to a positive and negative output signals at the silicon diode detectors 19 and 19'. The converted signal A may, for example, be assumed to provide a positive three watt output at pre-amplifier 23 while the converted signal B provides a negative one watt output at the pre-amplifier 23'. The pre-amplifier output signals are then directed to a single difference circuit 24 and combined to provide a positive two watt output which is indicative of a basic position for the radiation source 10, relative to the boresight axis of the missile 11. It is understood that the output signals received from diodes 20 and 20' of channel II are processed in a like manner to provide source position information relative to a plane, normal to said given plane, in which the receiving antenna arms 12' for the channel II are arranged.

Therefore, it is to be understood that the arms 12' of antenna 12 are so arranged in normally intersecting planes at opposite sides of the system's boresight axis, and are so coupled with an RF signal processing circuit 13, and the detector crystals 19, 19', 20, 20', as to provide pulsed signals A, B, C, and D to two pairs of receiver-computer system input terminals 21, 21' and 22, 22' so disposed as to feed loops or channels I and II of the receiver-computer. As the pulsed signals are fed to the computer system, the amplitudes thereof contain intensity and target position factors which dictate the magnitude of the input signals amplitudes. Source position amplitude is then utilized in channels I and II to determine the angular position of the source. As the signals pass from amplifiers 23, 23' and 31, 31' through the difference circuits 24 and 24' they are summed to indicate the radiation source position, the difference outputs are then amplified, fed to leading-edge track gates 26, 26', which provide an output signal dictated by the leading-edge of each pulse, thereby preventing the system from " homing" on reflected radiations or input pulse factors. The output from track gates 26, 26' are fed to pulse integrators 27, 27'. The outputs from the pulse integrators 27, 27' are used to drive the gain of the pairs of input pre-amplifiers 23, 23' and 31, 31'. The gain of the pre-amplifiers of each pair of amplifiers is caused to vary with respect to each other, inversely, under the dictates of a reference voltage imposed at the signal inverters 28 and 28' to provide a variation between the driving voltage for each pair of the amplifiers. The resulting difference signal output from the two loops is then directed to the missile's servo-control system 30 and 30' to provide directional control for the missile in accordance with the target radiation source's Cartesian co-ordinates thus determined.

As aforementioned, the receiver-computer input signals from the RF processing unit 13 contains an intensity factor. This factor is removed from the signals of channels I and II through a third, or sum, loop which utilizes a summing circuit, sum amplifier, reference comparator and integrator to impose a control signal on the difference amplifiers of said channels, in a manner as aforedescribed, so as to cancel the intensity factor from the amplitude of the pulse output of the difference amplifiers of said channels, thereby obviating false guidance input information created through the presence of an additional source of radiation within the radiation field F of the source being tracked.

By way of summary, is to be understood that each of the loops may be utilized independently and separately of the others, or in any combination thereof, to perform a unique, limited function. However, when the loops or channels I and II are combined through the third or sum loop a receiver-computer system is provided for locating a target source of radiation, disposed within a multi-source radiation field, with respect to the radiation "homing" missile.

Obviously many modifications and variations of the present invention are possible in the light of the above teachings. It is therefore to be understood that within the scope of the appended claims the invention may be practiced otherwise than as specifically described.

What is claimed is:

1. In a monopulse radar receiver system for determining the angular co-ordinates of a pulsed RF radiation source, the combination comprising:
    an RF signal processing circuit adapted to convert a directional antenna input signals to inversely related pairs of computer input pulses;
    a pair of automatic gain control pre-amplifiers connected to said processing circuit adapted to simultaneously receive and amplify the pairs of input signals;
    a difference circuit connected between the outputs of each pair of pre-amplifiers for providing a difference signal pulse;
    amplifying means connected with said difference circuit for amplifying said difference signal pulse;
    a leading-edge gate circuit connected with said amplifying means, adapted to be operatively triggered at the pulse-repetition rate of the pulses propagated by the RF radiation source for accepting only the leading edge of each amplified difference signal pulse;
    means for triggering the gate circuit;
    a pulse integrator circuit connected with the output of said gate circuit adapted to provide an output signal which is a function of the position of the source of radiation;
    direct connecting means joining the output of said integrator with one pre-amplifier of said pair for directing the integrator output signal to the one pre-amplifier for driving the gain thereof in a first direction;
    an inverter circuit connecting the output of said integrator with the other pre-amplifier of said pair, adapted to invert and combine a reference voltage with the output of said integrator circuit to provide an inverted gain control signal having a reference imposed thereon for driving the gain of the other pre-amplifier in a second direction opposed to said first direction; and a second difference circuit connected with the output of said integrator and the output of said inverter circuit for deriving a difference signal indicative of the angular co-ordinate of the source of pulsed RF radiation, relative to said system, when the difference signal is driven to a zero valve.

2. In a monopulse receiver circuit adapted to solve relative angular RF target-source position relative to the boresight axis of an anti-radar missile guidance system, means comprising in combination:

an RF receiving directional antenna having four output terminals;

two pairs of automatic gain control pre-amplifiers;

a crystal detector connected between each of said output terminals and an automatic gain control pre-amplifier for converting antenna output signals to video pulsed pre-amplifier input signals having an amplitude and polarity dictated by the intensity of the RF signals and the attitude of the target source relative to the antenna;

a difference circuit connected between the pre-amplifiers of each pair of said pairs of pre-amplifiers for simultaneously obtaining a pair of pre-amplifier output signals indicative of the attitude of the target-source relative to a pair of normally disposed planes intersecting along the boresight axis of a given missile for thereby obtaining intelligence signals indicative of boresight error with respect to said target source;

a pair of automatic gain control difference video amplifiers connected at the output of each difference circuit;

a leading-edge track gate circuit adapted to be triggered at a determinable rate for discarding received signals having a pulse repetition rate in variance with said target-source connected at the output of each video difference amplifier;

a pair of signal integrator circuits coupling the output of each track gate with the gain control means of the automatic gain control pre-amplifiers through which the connected track gate circuit receives a signal;

an integrator output signal inverter and reference voltage applying circuit connected between each integrator circuit and one of the pre-amplifiers connected thereto for providing an inverter output signal proportional to the detected boresight error for driving the output signals of the pre-amplifier-connected difference circuit to a zero valve;

circuit means for detecting and converting the inverter output signals to missile guidance control input signals;

a sum circuit connected with each crystal detector for adding the output signals from the detectors to provide an RF intensity signal;

an automatic gain control sum video amplifier connected with the output of said sum circuit for amplifying said intensity signal;

a reference voltage comparator circuit connected with the output of the sum video amplifier for combining the amplified intensity signal with a reference voltage and providing a difference output signal;

an integrator circuit connected between the output of the reference voltage comparator circuit and the gain control of each video amplifier adapted to control the gain thereof in accordance with the output signal from the comparator circuit for effectively canceling the effect of the intensity factor of the output signals from the video amplifier for thus negating the effects of the intensity factor of the input signals thereof; and means connecting the output of the sum video amplifier to the leading edge track gate for supplying gate triggering signals thereto, whereby said receiver may be locked onto the target-source of RF signals and maintin guidance thereon.

3. In a passive radar guidance receiver system adapted to utilize closed loop monopulse tecniques for homing on a target-source of pulsed RF radiation operating in a field of radiation propagated for means including a plurality of radiation sources and a plurality of surfaces reflecting RF signals, the combination comprising:

a forward-looking, four-way directional antenna system adapted to receive RF signals propagated within said field;

an RF signal processing circuit including two pairs of crystal detectors connected with said antenna system for converting said RF signals to pulsed radiation source and reflecting surface direction information signal pulses;

a first signal pulse processing, closed loop circuit connected with said processing system for rejecting received reflecting surface direction information signal pulses and processing said source direction information signal pulses to provide source position intelligence with respect to a first plane;

a second signal pulse processing, closed loop circuit connected with said processing system for rejecting received reflecting surface direction information signal pulses and processing said source direction information signal pulses to provide source position intelligence with respect to a second plane disposed at right angles to said first plane;

each signal processing closed loop circuit including a pair of RF signal processing circuit-connected automatic gain control pre-amplifiers, the input of each being connected to a given crystal of said pair for providing a pair of inversely related pulsed signals of varying amplitudes;

a difference circuit connected between the outputs of said pair of pre-amplifiers adapted to combine the output signals of said pair of pre-amplifiers to provide an output difference signal pulse;

an automatic gain control amplifier connected with the output of said difference circuit for amplifying the difference signal pulse;

a leading-edge track gate circuit connected with the output of said automatic gain control amplifier adapted to be triggered in response to the pulse repetition frequency of the target-source for accepting only the leading edge portion of each amplified difference signal pulse directed thereto to provide an integrator input pulse;

a gate circuit-connected pulse integrator circuit adapted to receive the integrator input pulse and provide an integrator output signal which is a function of the position of the target-source of pulsed RF radiation when the difference signal is of a zero value;

means connecting the output of said integrator directly to one pre-amplifier of said pair, whereby the integrator output signal serves as a first gain control signal for controlling the gain of said one pre-amplifier;

a signal inverting and reference signal voltage combining inverter circuit connected between the output of said integrator circuit and the other pre-amplifier of said pair of pre-amplifiers adapted to invert and impose a reference voltage on said integrator output signal for providing a second gain control signal for controlling the gain of said other pre-amplifier of said pair of pre-amplifiers, whereby the gain of said pre-amplifiers are caused to vary inversely with respect to each other for causing the difference signal to approach a zero value;

a second difference circuit connected between the output of the integrator and the output of said inverter circuit adapted to combine the first and second gain control signals for providing a servo control input signal; and a sum loop circuit connected with said first and second signal processing closed loop circuits and said RF signal processing circuit for eliminating the effects of source position intelligence for all sources having intensity factors differing from the intensity factors above a predetermined level, whereby the source position intelligence is reduced to position intelligence indicative of the target source position with respect to the first and second planes.

* * * * *